(12) United States Patent
Basso et al.

(10) Patent No.: US 9,003,437 B2
(45) Date of Patent: Apr. 7, 2015

(54) METHOD AND APPARATUS FOR UTILIZING A BROADCASTING CHANNEL

(75) Inventors: Andrea Basso, Marlboro, NJ (US); Paul Shala Henry, Holmdel, NJ (US); Byoung-Jo Kim, Morganville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1015 days.

(21) Appl. No.: 12/633,372

(22) Filed: Dec. 8, 2009

(65) Prior Publication Data

US 2011/0138430 A1 Jun. 9, 2011

(51) Int. Cl.
*H04N 7/16* (2011.01)
*H04N 7/173* (2011.01)
*H04N 7/10* (2006.01)
*H04N 7/025* (2006.01)
*H04N 21/236* (2011.01)
*H04N 21/434* (2011.01)
*H04N 21/442* (2011.01)

(52) U.S. Cl.
CPC ..... *H04N 21/23614* (2013.01); *H04N 7/17318* (2013.01); *H04N 21/4348* (2013.01); *H04N 21/44209* (2013.01)

(58) Field of Classification Search
None
See application file for complete search history.

(56) References Cited

U.S. PATENT DOCUMENTS

| 5,659,557 | A  | * | 8/1997 | Glover et al. | 714/752 |
| 6,966,059 | B1 | * | 11/2005 | Shetty et al. | 717/172 |
| 2008/0288851 | A1 | * | 11/2008 | Park | 714/784 |
| 2009/0067548 | A1 | * | 3/2009 | Song et al. | 375/321 |
| 2009/0103599 | A1 | * | 4/2009 | Yu et al. | 375/229 |
| 2010/0128174 | A1 | * | 5/2010 | Talty et al. | 348/461 |

* cited by examiner

*Primary Examiner* — Nasser Goodarzi
*Assistant Examiner* — Fred Peng

(57) ABSTRACT

A method and computer readable medium for encoding data onto a channel broadcasting a program are disclosed. For example, the method selects a channel that is being used to broadcast a program, generates data having characteristics in accordance with an error burst signature and transmits the data on the channel that is being used to broadcast the program.

18 Claims, 4 Drawing Sheets

METHOD AND APPARATUS FOR UTILIZING A BROADCASTING CHANNEL

BACKGROUND

Currently, television programs are broadcast with more information than is needed. One reason for this is to compensate for potential error bursts in the channel. As a result, additional bandwidth is unnecessarily consumed on a channel.

In addition, when a broadcaster wants to send additional data to a television viewer, the broadcaster typically provides the additional data to the viewer over a separate channel. Again, this consumes additional channels that may be used for providing additional content or programming.

Moreover, to transmit information to the viewer, the broadcaster may be required to add additional equipment to their existing infrastructure. This adds costs to transmitting the information to the viewer.

SUMMARY

In one embodiment, the present disclosure discloses a method and computer readable medium for encoding data onto a channel broadcasting a program. For example, the method selects a channel that is being used to broadcast a program, generates data having characteristics in accordance with an error burst signature and transmits the data on the channel that is being used to broadcast the program.

The present disclosure also discloses an embodiment for decoding data on a channel broadcasting a program. For example, the method tunes to a channel broadcasting a program, determines if the channel contains data that needs to be decoded other than the program and decodes the data if the channel contains the data that needs to be decoded other than the program.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and a computer readable medium for utilizing a broadcasting channel. For example, the present disclosure provides an overlay network using an existing network infrastructure by transmitting data over a channel that is broadcasting a program. The present disclosure takes advantage of error-burst-correction capabilities of digital televisions to transmit additional data over the channel that is being used without interfering with the program that an end user is watching.

In other words, the present disclosure avoids the need to send data via a separate channel and optionally a separate transmission architecture. As a result, the present disclosure provides more efficient use of bandwidth and television channels. This frees up bandwidth and channels to allow the broadcaster to utilize the additional channels or bandwidth to provide more programming or content to the end user.

The present disclosure provides an optionally independent overlay network on top of an existing network architecture. That is, the additional space on channels that is used to provide programming is used to transmit data. The data is disguised as an error burst and utilizes the error-burst-correction capabilities of televisions. Thus, the bandwidth and amount of data that can be transmitted is increased without requiring additional equipment within the network architecture.

Figure 1:
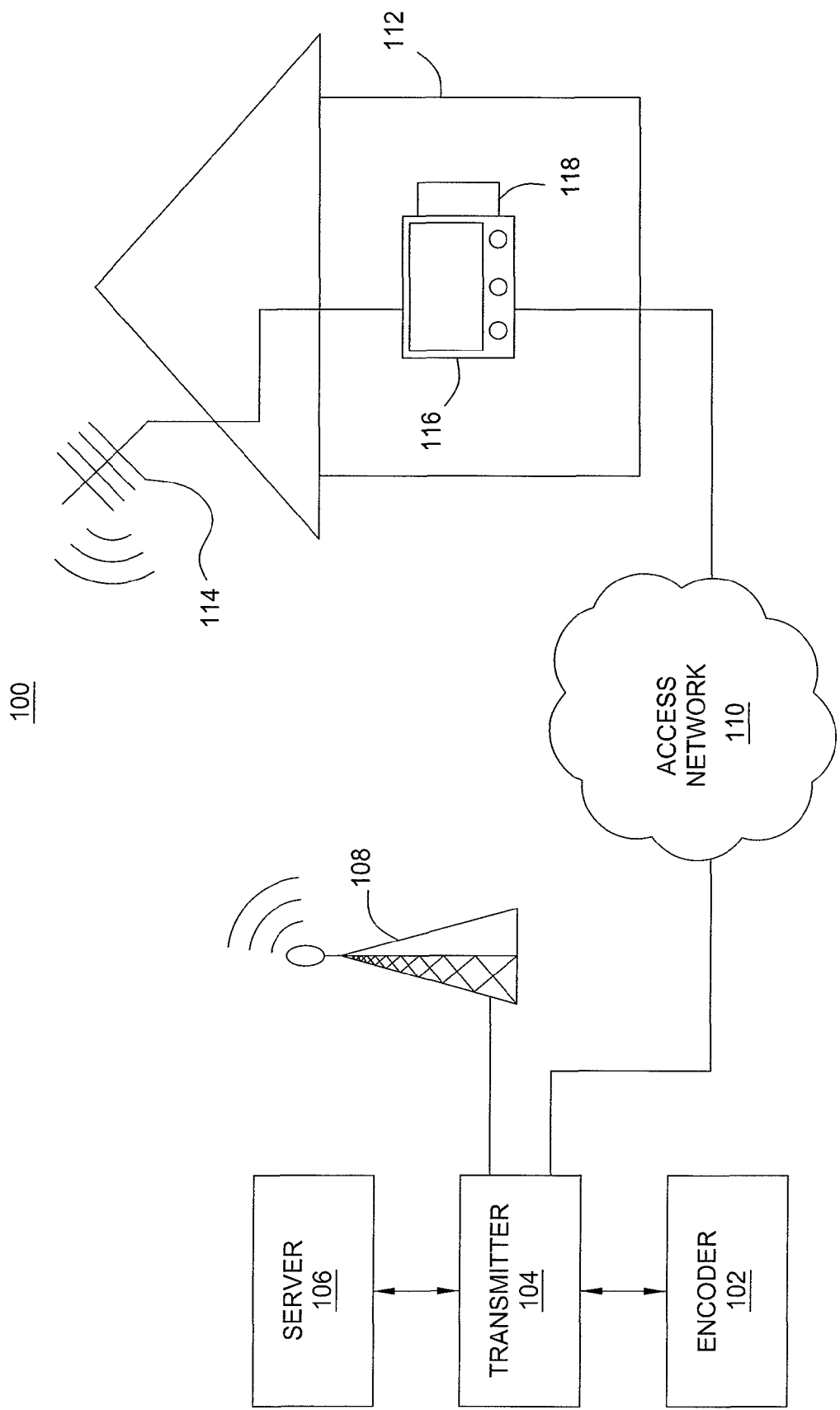
FIG. 1 illustrates an exemplary network related to the present disclosure.

FIG. 1 illustrates an exemplary network 100 related to the current disclosure. In one embodiment, the network 100 includes an encoder 102, a transmitter 104 and a server 106 on a transmission side of the network 100. The server 106 includes programming or content that is delivered via a television channel to an end user. Although only a single server 106 is illustrated, it should be noted that the network 100 may include one or more servers 106 for storing programming or content.

Figure 4:
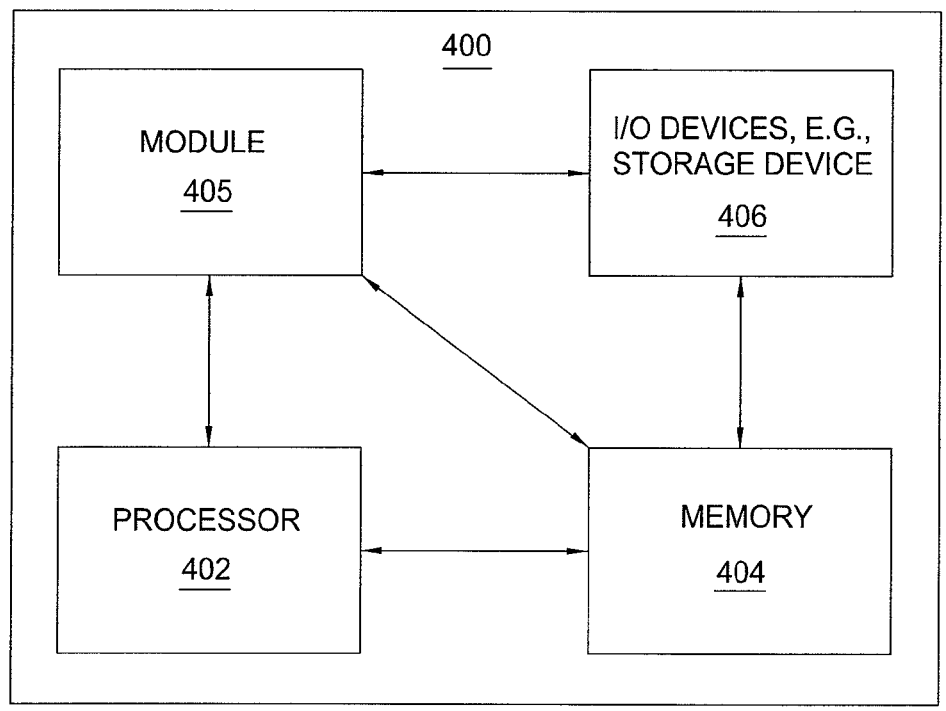
FIG. 4 illustrates a high-level block diagram of a general-purpose computer suitable for use in performing the functions described herein.

The encoder 102 generates data that is to be transmitted on the channel that is broadcasting a program. In one embodiment, the data is transmitted within a spectrum band for television broadcasts (e.g., 54 megahertz (MHz) to 900 MHz). The encoder 102 may be embodied as a general purpose computer as illustrated in FIG. 4 and discussed below.

The encoder 102 generates the data to have characteristics that are similar to an error burst. For example, digital televisions are currently manufactured with error-burst-correction capabilities (e.g., a Reed-Solomon decoder) capable of tolerating error bursts without interfering with the program that is broadcasted. In other words, the error bursts do not cause a user perceivable quality degradation of the program both on audio and video such as pixilation, picture distortion, intermittent picture, delay, flickering and the like. Thus, the viewer will not notice any difference in watching a program having an error burst from watching a program not having an error burst due to the error-burst-correction capability of the television.

The characteristics of the error burst that the television is able to tolerate vary depending on the decoder, additional hardware or circuitry in the television that interfaces with the decoder with different Advanced Television Systems Committee (ATSC) standards or equivalent European standards (DVB and DVB-H). For example, in one embodiment, the error burst may be a signal burst having a maximum duration of a first predefined time period (e.g., less than 190 microseconds) and a minimum separation of a second predefined time period (e.g., at least 5 milliseconds) between consecutive signal bursts. It should be noted that the predefined time periods can change as technology and the standards evolve.

In addition, the encoder 102 may insert information into the data to allow a decoder to recognize the data as real data that needs to be decoded and not an error burst. For example, the encoder 102 may insert information in a header portion of the data or may have a leading bit that is reserved to indicate that the real data is following.

The data may be any type of data. For example, the present disclosure may be used to send electronic programming guide (EPG) data, content intrinsic metadata generated by analysis of the broadcasted content, an advertisement associated with the program, a control signal to control a home appliance (e.g., a digital video recorder) that is networked to the television, an emergency announcement or a local broadcast announcement over the channel broadcasting the program.

In addition, the data may be sent to a specific group simulating a network multicast or to a subscription-based content delivery mechanism (e.g., an RSS feed). For example, the data may be provided as a paid service. An end user may pay a service provider to receive the data service. In one embodiment, the service provider provides a code in exchange for payment that allows a decoder in the television to properly decode the data on the same channel as the programming. In other words, the data can be provided on the same channel as the programming on a subscription basis.

In one embodiment, the encoder 102 can encrypt the data. For example the broadcaster or a third party working with the broadcaster may not want random data or data from an unauthorized source to be inserted on the channel carrying the programming. As a result, encryption of the data would ensure that the end user only receives and decodes data that is originated from an authorized source. The encryption may be any type of encryption as known in the art, e.g., a shared key that is provided by the broadcaster or a third party working with the broadcaster. For example, the shared key may be in a decoder that is provided to the end user to decode the data on the same channel as the programming.

The transmitter 104 combines the data generated by the encoder 102 with the programming to be delivered from the server 106 onto a single channel. For example, if a broadcaster wants to transmit a program on channel 4, the transmitter may also insert the data generated by the encoder 102 onto channel 4 with the program. The data is inserted such that the data appears to be an error burst on the channel.

In addition, the server 106 and the encoder 102 may use separate transmitters 104. In other words, the server 106 may be coupled to a first transmitter and the encoder 102 may be coupled to a second transmitter. The first and second transmitters may be physically separate and remotely located from one another. This allows the additional data to be transmitted separately by an entity other than the broadcaster.

In one embodiment, the program and the data may be transmitted on a channel over the air via a broadcasting antenna 108. In another embodiment, the program and the data may be transmitted on a channel via an access network 110. In addition, it should be noted that for simplicity, many of the network elements (e.g., border elements, gateways, application servers, routers, and the like) found in the access network 110 are omitted.

In one embodiment, the program and the data are received at a television 116 of an end user's home 112. For example, the television 116 may receive the broadcasted channel containing the program and the data over the air via an antenna 114 or via a connection to the access network 110.

As discussed above, the television 116 tunes to a channel that contains programming and data encoded by the encoder 102. A decoder 118 may be coupled to the television 116 to enable the television to properly decode the data on the channel separately from the program on the channel. In one embodiment, the decoder 118 may be provided to the end user by the broadcaster or a third party working with the broadcaster. In another embodiment, the decoder 118 may be manufactured as part of the television 116.

The decoder 118 may also be embodied as a general purpose computer as illustrated in FIG. 4 and discussed below. The decoder 118 is programmed to detect error bursts in a channel broadcasting a program and determine whether the error burst is real data that needs to be decoded or an error burst that needs to simply be corrected, e.g., using forward error correction or similar algorithms. As discussed above, the data may contain information that the decoder 118 recognizes as an indicator that the error burst is real data that needs to be decoded.

After the data is decoded, the data may be displayed as an overlay (e.g., an opaque or a semi-transparent overlay) over the program on the same channel or may be processed accordingly if it is a control signal. As discussed above, the data may be any type of data. For example, the present disclosure may be used to send electronic programming guide (EPG) data, an advertisement associated with the program, a control signal to control a home appliance (e.g., a digital video recorder) that is networked to the television, an emergency announcement or a local broadcast announcement over the channel broadcasting the program.

Figure 2:
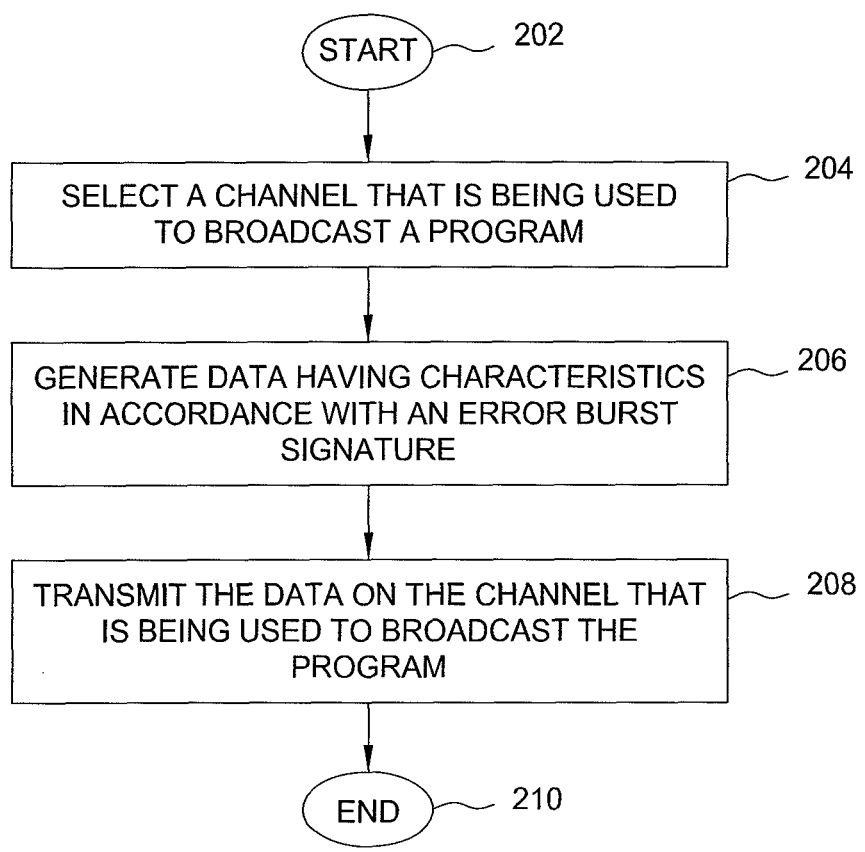
FIG. 2 illustrates a flowchart of a method encoding data onto a channel broadcasting a program.

FIG. 2 illustrates a flowchart of a method 200 for encoding data onto a channel broadcasting a program. The reader is encouraged to refer back to FIG. 1 simultaneously while reading the steps of method 200. In one embodiment, one or more steps of the method 200 may be implemented by the encoder 102 or a general purpose computer having a processor, a memory and input/output devices as illustrated below in FIG. 4.

The method 200 begins at step 202. At step 204, the method 200 selects a channel that is being used to broadcast a program. For example, the present disclosure utilizes a channel that is already being used to broadcast a program. This is possible by taking advantage of the error-burst-correction capability of televisions. As a result, a separate channel is not required for transmitting additional data to the end user. Thus, the additional channels that are not used for transmitting data can be used for providing additional programming or content to the end user.

At step 206, the method generates data having characteristics in accordance with an error burst signature. For example, an encoder can be programmed to generate data that resembles an error burst in a television signal. As noted above, televisions can tolerate error bursts in the television signal without interfering with the picture quality of a program carried in the television signal. This capability is taken advantage of by the present disclosure to transmit data over the same channel that is being used to broadcast a program.

In one embodiment, the characteristics of the data are similar to the characteristics of an error burst that is tolerable by a decoder of the television. For example, depending on the type of decoder, the circuitry and hardware in the television and the ATSC standard that is used, the characteristics can vary. In one example, the characteristics may require the data to have a signal burst that has a maximum duration of less than 190 microseconds and a minimum separation of at least 5 milliseconds between consecutive signal bursts. However, in other configurations, the data may be required to have a signal burst that has a maximum duration of less than 160 microseconds. It should be noted that the examples above are not limiting and only provided as examples. In other words, as technology and standards evolve, the pre-defined time periods for the maximum duration and minimum separation can change according to the current technology or standard.

At step 208, the method 200 transmits the data on the channel that is being used to broadcast the program. For example, a transmitter may combine the programming and the data generated by the encoder onto a single channel. Thus, the single channel broadcasts both the programming information and the data generated by the encoder. Notably, the data is generated such that it does not interfere with the programming when being broadcasted on the same channel. The method ends at step 210.

Figure 3:
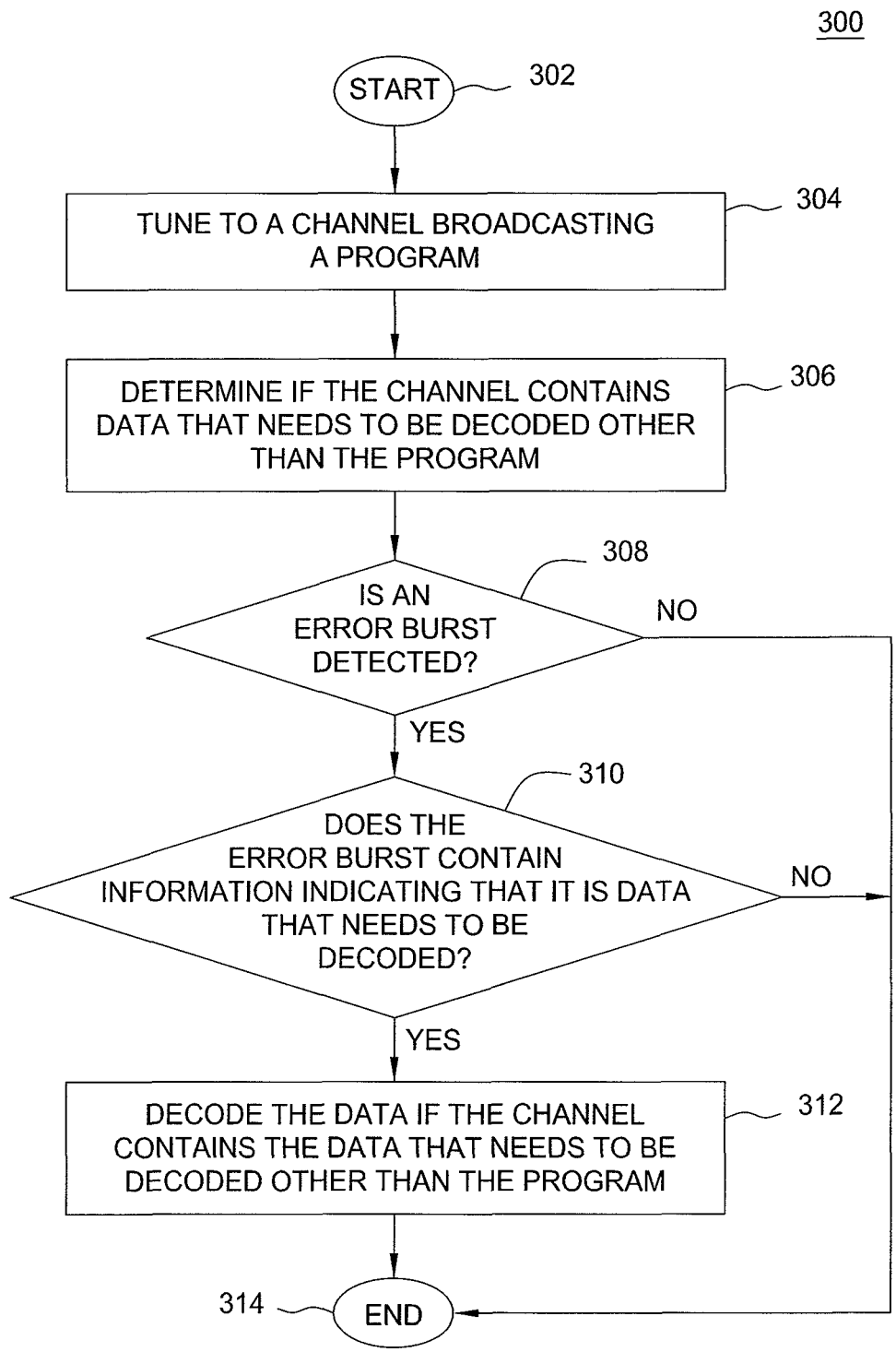
FIG. 3 illustrates a flowchart of a method for decoding data on a channel broadcasting a program.

FIG. 3 illustrates a flowchart of a method 300 for decoding data on a channel broadcasting a program. The reader is encouraged to refer back to FIG. 1 simultaneously while reading the steps of method 300. In one embodiment, one or more steps of the method 300 may be implemented by the decoder 118 or a general purpose computer having a processor, a memory and input/output devices as illustrated below in FIG. 4.

The method 300 begins at step 302. At step 304, the method 300 tunes to a channel broadcasting a program. For example, an end user in their home may tune their television to channel 4 to watch a particular program. However, channel 4 may also carry data that is inserted by the broadcaster unbeknownst to the end user.

At step 306, the method 300 determines if the channel contains data that needs to be decoded other than the program. At step 308, the method 300 determines if an error burst is detected. For example, an error burst may have particular characteristics within a television signal. As discussed, one example of an error burst is a signal burst that has a maximum duration of less than 190 microseconds and a minimum separation of at least 5 milliseconds between consecutive signal bursts. If such a signal burst is detected, the method 300 may determine that an error burst is detected. If an error burst is detected, the method 300 proceeds to step 310. If an error burst is not detected, the method 300 proceeds to step 314 and ends.

At step 310, the method 300 determines if the error burst contains information indicating that it is data that needs to be decoded. As discussed above, the encoder may include information in the data indicating that it is real data that needs to be decoded separately from the program on the same channel. Some examples discussed above include including information in a header of the data or having a leading bit sequence that is reserved to indicate that the real data is following. If the method 300 determines that the error burst is just an error burst that needs to be corrected, the method 300 proceeds to step 314 and ends. If the method 300 determines that the error burst contains real data that needs to be decoded, the method 300 proceeds to step 312.

At step 312, the method 300 decodes the data if the channel contains the data that needs to be decoded other than the program. When decoded, the data may be displayed to the user as an electronic programming guide over the program. In another embodiment, the decoded data can be advertisements for items in a scene of the program and be located near the items in the program.

In yet another embodiment, the data may be unrelated to the program. For example, an emergency broadcast message can be sent over the channel broadcasting the program or a local announcement regarding a particular town or neighborhood can be sent over the channel broadcasting the program. Alternatively, the data can be a control signal to control a home appliance connected to the television. In other words, the television can be used as a gateway. Thus, an end user could access the access network via the Internet and send a control signal to control their home digital video recorder (DVR). The control signal is sent over the same channel used to broadcast a television program as discussed above. The method 300 ends at step 314.

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for encoding or decoding data on a channel broadcasting a program, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 405 for encoding or decoding data on a channel broadcasting a program can be loaded into memory 404 and executed by processor 402 to implement the functions as discussed above. As such, the present method 405 for encoding or decoding data on a channel broadcasting a program (including associated data structures) of the present disclosure can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for transmitting data onto a channel broadcasting a program, comprising:
   selecting, by a processor, the channel that is being used to broadcast the program;
   generating, by the processor, the data having characteristics in accordance with an error burst signature, wherein the data is independent of the program and is encoded with a header portion for allowing a receiver to identify the data and to decode the data during an error burst detection; and
   transmitting, by the processor, the data on the channel that is being used to broadcast the program, wherein the data resembles an error burst.

2. The method of claim 1, wherein the data is separately decoded from the program at the receiver.

3. The method of claim 1, wherein the data is encrypted.

4. The method of claim 1, wherein the characteristics of the data comprise:
   a signal burst having a maximum duration of less than a first predefined time period; and
   a minimum separation of a second predefined time period between consecutive signal bursts.

5. The method of claim 1, wherein the data is transmitted on the channel being used to broadcast the program without interfering with the program.

6. The method of claim 1, wherein the data is displayed with the program.

7. A non-transitory computer-readable medium storing a plurality of instructions which, when executed by a processor, cause the processor to perform operations for transmitting data onto a channel broadcasting a program, the operations comprising:
   selecting the channel that is being used to broadcast the program;
   generating the data having characteristics in accordance with an error burst signature, wherein the data is independent of the program and is encoded with a header portion for allowing a receiver to identify the data and to decode the data during an error burst detection; and
   transmitting the data on the channel that is being used to broadcast the program, wherein the data resembles an error burst.

8. The non-transitory computer-readable medium of claim 7, wherein the data is separately decoded from the program at the receiver.

9. The non-transitory computer-readable medium of claim 7, wherein the data is encrypted.

10. The non-transitory computer-readable medium of claim 7, wherein the characteristics of the data comprise:
   a signal burst having a maximum duration of less than a first predefined time period; and
   a minimum separation of a second predefined time period between consecutive signal bursts.

11. The non-transitory computer-readable medium of claim 7, wherein the data is transmitted on the channel being used to broadcast the program without interfering with the program.

12. The non-transitory computer-readable medium of claim 7, wherein the data is displayed with the program.

13. A method for decoding data on a channel broadcasting a program, comprising:
   tuning, by a processor, to the channel broadcasting the program;
   determining, by the processor, if the channel contains the data that needs to be decoded other than the program, wherein the data is independent of the program and is encoded with a header portion for allowing a receiver to identify the data and to decode the data during an error burst detection; and
   decoding, by the processor, the data when the channel contains the data that needs to be decoded other than the program, wherein the data resembles an error burst.

14. The method of claim 13, wherein the determining comprises:
   detecting an error burst; and
   identifying the error burst as the data that needs to be decoded based upon information in the error burst.

15. The method of claim 14, wherein the error burst comprises:
   a signal burst having a maximum duration of less than a first predefined time period; and
   a minimum separation of a second predefined time period between consecutive signal bursts.

16. The method of claim 13, wherein the data is separately decoded from the program.

17. The method of claim 13, wherein the data is encrypted.

18. The method of claim 13, further comprising:
   displaying the data with the program as an overlay.

* * * * *